United States Patent [19]
House

[11] Patent Number: 5,916,849
[45] Date of Patent: Jun. 29, 1999

[54] POLYSACCHARIDE-CONTAINING WELL DRILLING AND SERVICING FLUIDS

[75] Inventor: Roy F. House, Houston, Tex.

[73] Assignee: Venture Innovations, Inc., Lafayette, La.

[21] Appl. No.: 09/121,712

[22] Filed: Jul. 24, 1998

[51] Int. Cl.$^6$ .................................................... C09K 7/02
[52] U.S. Cl. ......................... 507/110; 507/140; 507/209; 507/213; 507/269
[58] Field of Search ................................... 507/110, 112, 507/140, 209, 213, 269

[56] References Cited

U.S. PATENT DOCUMENTS

| | | | |
|---|---|---|---|
| 2,713,029 | 7/1955 | Fuller | 507/110 |
| 4,900,457 | 2/1990 | Clarke-Sturman | 507/110 |
| 5,514,644 | 5/1996 | Dobson | 507/140 |

*Primary Examiner*—Philip Tucker
*Attorney, Agent, or Firm*—Roy F. House

[57] ABSTRACT

Disclosed is a method of increasing the thermal stability or decreasing the fluid loss of aqueous polysaccharide-containing fluids which comprises incorporating into the fluids an oligosaccharide mixture composed of arabinose, mannose, galactose, glucose, and xylose sugar units, the oligosaccharide mixture consisting of the water soluble portion of thermally hydrolyzed lignocellulose and consisting primarily of pentosans and hexosans containing from one to four combined sugar units.

Preferred fluids contain a biopolymer which increases the low shear rate viscosity of the fluids. Fluids which contain polysaccharides which impart other desirable characteristics to the fluids, such as increased viscosity at higher shear rates, fluid loss control, and the like, also exhibit increased thermal stability upon incorporating the oligosaccharide mixture therein.

19 Claims, No Drawings

POLYSACCHARIDE-CONTAINING WELL DRILLING AND SERVICING FLUIDS

FIELD OF THE INVENTION

The invention relates to fluids used in the drilling and/or servicing of oil and/or gas wells, and particularly drilling fluids, drill-in fluids, workover fluids, completion fluids, perforating fluids, and the like. The invention provides enhanced thermal stability and decreased fluid loss to such fluids which have been viscosified with a polysaccharide polymer which increases the low shear rate viscosity of the fluids.

BACKGROUND OF THE INVENTION

It is known to produce viscoelastic fluids for use in oil well drilling and servicing, especially for the so called "drill-in" fluids used in horizontal drilling within a hydrocarbon-bearing formation. See for example the following references: "Drill-In Fluids Improve high Angle Well Production," p. 5–11, Supplemental to the Petroleum Engineer International, March, 1995; and "Soluble Bridging Particle Drilling System Generates Successful Completions In Unconsolidated Sand Reservoirs," Jay Dobson and Delton Kayga, presented at the 5th International Conference On Horizontal Well Technology, Amsterdam, The Netherlands, Jul. 14–16, 1993.

Such fluids are characterized as having a rheological profile which is shear thinning, having a high viscosity at extremely low shear rates and a low viscosity at high shear rates. Thus such fluids are pseudoplastic having a high yield stress.

This type of rheology is produced by hydrating in the fluid certain water soluble polymers. These polymers are biopolymers, i.e., microbially produced polysaccharides or heteropolysaccharides, and are well known in the art.

It is well known that polysaccharides are degraded by heat as the temperature of the fluid containing them is increased. The thermal degradation of the polysaccharides decreases the viscosity of the fluid, most especially the low shear rate viscosity which provides the fluid with its desirable characteristics as many other water soluble polymers and other materials can provide the high shear rate viscosity required.

U.S. Pat. No. 5,514,644 discloses the use of magnesia and a thiosulfate salt to enhance the thermal stability of polysaccharide-containing, saturated salt brines. It is disclosed in the article "Biopolymer Solution Viscosity Stabilization-Polymer Degradation and Antioxidant Use," Scott L. Wellington, Society of Petroleum Engineers Journal, December, 1983, pp. 901–912, that a combination of a free radical transfer agent, a sacrificial easily oxidizable alcohol, a compatible oxygen scavenger, and a sufficient brine concentration were required to stabilize xanthan gum-containing fluids. U.S. Pat. No. 4,485,020 discloses the preparation of a thermostable, viscous xanthan gum solution by heating a xanthan gum solution in the presence of at least one $C_1$ to $C_{10}$ alkyl or $C_3$ to $C_{10}$ cycloaklyl substituted primary or secondary mono- or diamine having an upper limit of a total of 15 carbon atoms at a temperature in the range of about 30° to about 130° C. from about 5 minutes to 120 minutes. U.S. Pat. No. 4,900,457 discloses that the thermal stability of aqueous polysaccharide solutions can be significantly enhanced by incorporating certain formate salts therein.

Thus there is a need for enhancing the thermal stability of polysaccharide-containing aqueous fluids, particularly at low concentrations of soluble salts dissolved therein.

SUMMARY OF THE INVENTION

I have found that the stability to thermal degradation of polysaccharide-containing aqueous fluids which exhibit an enhanced low shear rate viscosity, which may hereinafter be referred to as ELSRV fluids, is enhanced, and the fluid loss is reduced, by adding to the ELSRV fluid an oligosaccharide mixture composed of arabinose, mannose, galactose, glucose, and xylose sugar units, consisting primarily of pentosans and hexosans containing from one to four combined sugar units, the oligosaccharide mixture preferably consisting of the water soluble portion of thermally hydrolyzed lignocellulose. For the purpose of this invention, the ELSRV fluids have a shear thinning index of at least 10, wherein the shear thinning index is the ratio of the Brookfield viscosity of a fluid at 0.5 rpm to the viscosity of the fluid at 100 rpm, and is indicative of the shear thinning characteristics of the fluid, preferably at least 20.

The oligosaccharide mixture also enhances the thermal stability of polysaccharide-containing aqueous fluids which do not exhibit an enhanced low shear rate viscosity such as fluids containing cellulose derivatives.

It is an object of this invention to provide a process for enhancing the thermal stability of aqueous polysaccharide-containing fluids as evidenced by the low shear rate viscosity of the fluids, and the fluids prepared thereof.

It is another object of this invention to provide a process for enhancing the thermal stability of aqueous fluids containing polysaccharides which do not exhibit an elevated low shear rate viscosity, and the fluids prepared thereby.

It is also an object of the invention to provide a process for decreasing the fluid loss of aqueous polysaccharide-containing fluids, and the fluids prepared thereof. While the invention is susceptible of various modifications and alternative forms, specific embodiments thereof will hereinafter be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

The compositions can comprise, consist essentially of, or consist of the stated materials. The method can comprise, consist essentially of, or consist of the stated steps with the stated materials.

PREFERRED EMBODIMENTS OF THE INVENTION

The oligosaccharide mixture (hereinafter sometimes referred to as "OSM") useful in the present invention is preferably obtained from the thermal hydrolysis of lignocellulose materials. The thermal hydrolysis may be carried out in any one of several manners such as by subjecting wood of trees and woody materials of corn stalks, cane, and other vegetable growths to the action of steam under elevated temperatures and pressures. The OSM may also be obtained by acid hydrolysis of lignocelluloses as well as by saccharification of wood. Preferably, however, the thermal hydrolysis is carried out by charging wood chips to a closed chamber (e.g., a gun as set forth in Mason U.S. Pat. No. 1,824,221, incorporated herein by reference), subjecting the chips to pressure of about 200–1200 pounds per square inch and a temperature of about 200–300° C. for approximately 30 minutes to 5 seconds, respectively, in the presence of steam, and then discharging the woody material from the gun through a constricted discharge means therein into a zone of lower pressure, preferably atmospheric pressure, thereby exploding the wood chips into comparatively finely divided elongated fibers. Under this treatment the wood undergoes hydrolysis, and water-insoluble and readily hydrolyzable constituents thereof are rendered soluble or dispersible in water. These water solubles are removed from the fiber, which may be accomplished by washing the fiber in water or by squeezing the fiber with rolls and/or screws and the like apparatus. See for example Boehm U.S. Pat. No. 2,224,135, incorporated herein by reference. The water solubles can be concentrated or rendered solid by removing water therefrom, as by evaporation, drying, etc.

Water solubles resulting from such hydrolysis of lignocellulose materials as a class are applicable to this invention. A typical analysis of the water solubles, the OSM of this invention, made from pine wood is as follows: hexosans and pentosans, 70% by weight; lignin, 15% by weight; non-sugar carbohydrates, 10% by weight; and gums, 5% by weight. The constituents of the OSM will vary somewhat depending on the type of lignocellulose material hydrolyzed and the conditions, e.g., time, temperature, pressure, etc. Depending upon these conditions, the constituents of the OSM can vary roughly as follows: pentosans and hexosans, 60–80% by weight; lignin, 5–25% by weight; non-sugar carbohydrates, 5–15% by weight; and gums, 2–8% by weight. The pentosans and hexosans contain primarily from one to about four combined sugar units composed of arabinose, mannose, galactose, glucose, and xylose sugar units.

It has been disclosed in Fuller U.S. Pat. No. 2,713,029 and Brink et al. U.S. Pat. No. 2,713,030 that the addition of small amounts of the OSM to clay-water drilling mud systems, such as from about 0.07–1.75 pounds of OSM per 42 gallon barrel of mud, imparts thereto low viscosity and gel strength.

Incorporation of the OSM into aqueous ELSRV well drilling and servicing fluids which contain one or more polysaccharides hydrated (solublized or dispersed) therein enhances the thermal stability of the fluids as measured by the low shear rate viscosity, i.e., the viscosity at less than about one $sec^{-1}$.

The minimum concentration of the OSM incorporated into the aqueous polysaccharide-containing fluids is that amount, as determined by routine testing, which increases the thermal stability of the fluid and/or which decreases the fluid loss of the fluid. In the case of ELSRV fluids, this is determined by evaluating the low shear rate viscosity of the fluid and the fluid loss after aging at the desired temperature and comparing the results obtained with those of the fluid which does not contain the OSM. In the case of fluids containing polysaccharides which do not significantly enhance the low shear rate viscosity of the fluids, the thermal stability can be determined by evaluating other properties of the fluids such as the viscosity at higher shear rates, fluid loss, and the like, and comparing the results obtained with those of the fluid which does not contain the OSM.

Generally the concentration of the OSM will be from about 0.7 kg/m$^3$ (0.25 ppb) to about 428 kg/m$^3$ (150 ppb), preferably from about 1.4 kg/m$^3$ (0.5 ppb) to about 171 kg/m$^3$ (60 ppb), most preferably from about 1.4 kg/m$^3$ (0.5 ppb) to about 57 kg/m$^3$ (20 ppb).

The polymers useful in the ELSRV fluids of this invention comprise any water soluble polymer which increases the low shear rate viscosity of the fluid to produce a fluid exhibiting a high yield stress, shear thinning behavior. Particularly useful are biopolymers produced by the action of bacteria, fungi, or other microorganisms on a suitable substrate. Exemplary biopolymers are the polysaccharides produced by the action of Xanthomonas compestris bacteria which are known as xanthan gums. These are available commercially from several sources including: Kelco Oil Field Group, Inc., under the trademarks "Xanvis" and "Kelzan"; Rhone-Poulenc Chimie Fine, under the trademark "Rhodopol 23-p"; Pfizer Inc., under the trademark "Flocon 4800C"; Shell International Chemical Company of London, U.K., under the trademark "Shellflo ZA"; and Drilling Specialties Company, under the trademark "Flowzan." See for example U.S. Pat. No. 4,299,825 and U.S. Pat. No. 4,758,356, each incorporated herein by reference. Other biopolymers useful in the fluids of this invention are the so-called welan gums produced by fermentation with a microorganism of the genus Alcaligenes. See for example U.S. Pat. No. 4,342,866, incorporated herein by reference. Gellan gums are disclosed in U.S. Pat. No. 4,503,084, incorporated herein by reference. Scleroglucan polysaccharides produced by fungi of the genus sclerotium are disclosed in U.S. Pat. No. 3,301,848, incorporated herein by reference. Commercially available scleroglucan is sold under the trademarks "Polytran" from the Pillsbury Company and "Actigum CS-11" from CECA S.A. Succinoglycan polysaccharides are produced by cultivating a slime-forming species of Pseudomonas, Rhizobium, Alcaligenes or Agrobacterium, e.g., Pseudomonas sp. NCIB 11264, Pseudomonas sp. NCIB 11592 or Agrobacterium radiobacter NCIB 11883, or mutants thereof, as described in European Patent No. A40445 or A138255. Commercially available succinoglycan biopolymer is sold by Shell International Chemical Company of London, U.K., under the trademark "Shellflo-S".

Other polysaccharides added to aqueous base borehole fluids to provide characteristics to the fluids other than increasing the low shear rate viscosity include: cellulose derivatives, such as carboxymethyl cellulose, hydroxyethyl cellulose, mixed ethers, and the like; starch derivatives such as carboxymethyl starch, hydroxyethyl starch, hydroxypropyl starch, mixed ethers, and the like, including the partially crosslinked derivatives thereof; guar gum and derivatives thereof; and other polysaccharides as are well known in the art. Such polysaccharides may increase the viscosity at higher shear rates, decrease the fluid loss, or provide other characteristics to the fluids.

The minimum concentration of the polymer required to increase the low shear rate viscosity of the fluid can be determined by routine testing. Thus the minimum concentration will be an amount sufficient to impart to the fluid the desired low shear rate viscosity. Generally the fluids will contain a concentration from about 0.7 kg/M$^3$ (0.25 ppb) to about 17.1 kg/m$^3$ (6 ppb), preferably from about 1.4 kg/m$^3$ (0.5 ppb) to about 14.25 kg/m$^3$ (5 ppb).

The water base borehole fluids of this invention generally will contain materials well known in the art to provide various characteristics or properties to the fluid. Thus the fluids may contain one or more viscosifiers or suspending agents in addition to the polysaccharide required, weighting agents, corrosion inhibitors, soluble salts, biocides, fungicides, seepage loss control additives, bridging agents, deflocculants, lubricity additives, shale control additives, pH control additives, and other additives as desired.

The borehole fluids may contain one or more materials which function as encapsulating or fluid loss control additives to restrict the entry of liquid from the fluid to the contacted shale. Representative materials known in the art include partially solublized starch, gelatinized starch, starch derivatives, cellulose derivatives, humic acid salts (lignite salts), lignosulfonates, gums, synthetic water soluble polymers, and mixtures thereof.

The fluids of this invention preferably have a pH in the range from about 7.5 to about 11.5, most preferably from 8 to about 11. The pH can be obtained as is well known in the art by the addition of bases to the fluid, such as potassium hydroxide, potassium carbonate, potassium humate, sodium hydroxide, sodium carbonate, sodium humate, magnesium oxide, calcium hydroxide, zinc oxide, and mixtures thereof. The preferred base is magnesium hydroxide.

It has been determined that magnesium oxide in combination with the OSM of this invention significantly enhances the thermal stability of the ELSRV fluids.

It has long been known that magnesium oxide enhances the thermal stability of aqueous fluids containing polysaccharide polymers such as xanthan gum, hydroxyethylcellulose, and the like. Presumably the magnesium oxide functions as an alkaline buffer to prevent the pH of the fluid from decreasing appreciably upon aging the fluid at elevated temperatures.

If desired, water soluble potassium compounds can be incorporated into the fluids of this invention to increase the potassium ion content thereof. Thus it is known to add potassium chloride, potassium formate, potassium acetate, and the like to fluids to enhance the shale stabilizing characteristics of the fluids.

The borehole fluids of this invention contains an aqueous phase which may be fresh water, a natural brine, sea water or a formulated brine in which the polysaccharide and OSM are solublized. The formulated brine is manufactured by dissolving one or more soluble salts in water, a natural brine, or sea water. Representative soluble salts are the chloride, bromide, acetate and formate salts of potassium, sodium, calcium, magnesium and zinc.

The fluids may be prepared by mixing with the aqueous phase the desired components in any order, except for the weight material, if used, which is generally added last such that it will remain suspended in the fluid. The OSM may be added to the aqueous phase before or after any of the desired components are added. If water soluble salts are added to provide a formulated brine aqueous phase, it is preferred that the water soluble salts be added after the other desired components, except the weight material, have been mixed.

The borehole fluid of this invention is circulated within a borehole during well drilling or servicing operations as is well known in the art.

In a preferred embodiment of the invention, the OSM and the polysaccharide viscosifier are mixed together prior to their addition to the aqueous fluid. Thus this additive mixture will contain from about 0.15 part by weight of the OSM per part of the polysaccharide, to about 15 parts about by weight of the OSM per part of the polysaccharide, preferably from about 0.3 part by weight of the OSM per part of the polysaccharide to about 10 parts by weight of the OSM per part by weight of the polysaccharide.

In order to more completely describe the invention, the following non-limiting examples are given. In these examples and in this specification, the following abbreviations may be used: cc=cubic centimeters; g=gram; kg=kilogram; $m^3$=cubic meter; ppb=pounds per 42 gallon barrel; PV=API plastic viscosity in centipoise; YP=API yield point in pounds per 100 square feet; rpm=revolutions per minute; LSRV=low shear rate viscosity in centipoise as determined with a Brookfield RV-1 Viscometer at 0.5 rpm; STI=the shear thinning index obtained with a Brookfield Viscometer, which is the ratio of the 0.5 rpm viscosity to the 100 rpm viscosity; BI=Biopolymer I which is KELZAN XCD xanthan gum; BII=Biopolymer II which is BIOZAN, a product of the Kelco Oil Field Group, Inc.; BIII=Biopolymer III which is XANVIS, a xanthan gum; STS=sodium thiosulfate; OSM=oligosaccharide mixture as set forth hereinbefore.

The plastic viscosity, yield point, 3 rpm viscosity, and fluid loss were determined by the procedures set forth in the American Petroleum Institute's Recommended Practice 13B-1.

EXAMPLE 1

Various aqueous fluids were prepared by adding to 350 milliliters of water mixing at low shear in a Waring Blendor (sufficient to form a vortex) the concentrations of Biopolymer I, OSM, and magnesium oxide set forth in Table A. The fluids were then mixed five minutes at moderate shear, placed in glass jars, capped, and aged for 16 hours at 82.2° C. (180° F.). The API rheology and low shear rate rheology were obtained after the fluids were cooled to room temperature and mixed well by hand shaking. The data obtained are set forth in Table A.

EXAMPLE 2

Various fluids were prepared as in Example 1. The initial rheology and the rheology obtained after aging for 16 hours at 82.2° C. is set forth in Table B.

EXAMPLE 3

Various fluids were prepared using the procedure set forth in Example 1. The fluids contained either Biopolymer I or Biopolymer II, and various concentrations of the OSM, magnesium oxide, or zinc oxide as set forth in Table C. The rheology data obtained initially and after aging for 16 hours at 82.2° C. are set forth in Table C.

EXAMPLE 4

Various fluids containing 4.285 $kg/m^3$ (1.5 ppb) Biopolymer I and 2.857 $kg/m^3$ (1.0 ppb) magnesium oxide were prepared as in Example 1. The fluids additionally contained the concentrations of the OSM and sodium thiosulfate set forth in Table D. The low shear rate viscosity and thixotropic index of the fluids before and after aging at 82.2° C. for 16 hours are set forth in Table D.

EXAMPLE 5

Fluids containing 4.285 $kg/m^3$ (1.5 ppb) of various polysaccharides which do not appreciably increase the low shear rate viscosity but which provide other desired properties such as enhanced viscosity at higher shear rates, fluid loss control, and the like, were prepared as in Example 1. The fluids additionally contained the concentrations of sodium hydroxide, magnesium oxide, and the OSM set forth in Table E. The Theological data obtained after aging the fluids at 82.2° C. for 16 hours are set forth in Table E.

EXAMPLE 6

Fluids were prepared as in Example 1 containing 4.285 $kg/m^3$ (1.5 ppb) pf XANVIS xanthan gum (Biopolymer III) and the concentrations of MgO and OSM set forth in Table F. The initial rheology, and the rheology and fluid loss obtained after aging the fluids for 16 hours at 82.2° C. is set forth in Table F. The data obtained are set forth in Table F.

EXAMPLE 7

Fluids were prepared as in Example 1 containing the concentrations of KELZAN XCD xanthan gum, magnesium oxide, and OSM set forth in Table G. The fluids were evaluated as in Example 6.

TABLE A

| Composition | 1 | 2 | 3 | 4 | 5 | 6 | 7 | 8 | 9 |
|---|---|---|---|---|---|---|---|---|---|
| Water, cc | 350 | 350 | 350 | 350 | 350 | 350 | 350 | 350 | 350 |
| BI, g | 1.5 | 1.5 | 1.5 | 1.5 | 1.5 | 1.5 | 1.5 | 1.5 | 1.5 |
| OSM, g | 0 | 10 | 20 | 0 | 0.2 | 0.5 | 10 | 20 | 60 |
| MgO, g | 0 | 0 | 0 | 2 | 2 | 2 | 2 | 2 | 2 |
| Rheology After Aging 16 Hours at 82.2° C. (180° F.) | | | | | | | | | |
| PV | 5 | 12 | 11 | 4.5 | 4 | 10 | 6.5 | 8 | 33 |
| YP | 6 | 23 | 23 | 12.5 | 12 | 18 | 18.5 | 23 | 41 |
| 3 rpm | 1 | 10 | 8.5 | 3 | 4.5 | 7.5 | 8.5 | 10 | 18.5 |
| LSRV (×10⁻³) | 0.2 | 17 | 14 | 0.8 | 2.6 | 9.2 | 10.4 | 15 | 40 |
| STI | 3.9 | 54.8 | 50.3 | 6.5 | 20 | 41.8 | 44.8 | 53.5 | 63 |

TABLE B

| Composition | 1 | 2 | 3 | 4 | 5 | 6 | 7 |
|---|---|---|---|---|---|---|---|
| Water, cc | 350 | 350 | 350 | 350 | 350 | 350 | 350 |
| BI, g | 2 | 2 | 2 | 2.5 | 2.5 | 2.5 | 1 |
| OSM, g | 0 | 0 | 10 | 0 | 0 | 10 | 10 |
| MgO, g | 0 | 2 | 2 | 0 | 2 | 2 | 2 |
| Initial Rheology | | | | | | | |
| PV | 6.5 | 6 | 8 | 7.5 | 7 | 8 | — |
| YP | 22 | 22 | 53 | 30 | 30 | 61 | — |
| 3 rpm | 13 | 12 | 16 | 20 | 17.5 | 20.5 | — |
| LSRV (×10⁻³) | 33.2 | 25.6 | 46.2 | 52.4 | 42.8 | 78 | — |
| STI | 108.9 | 85.3 | 89.7 | 117.8 | 97.7 | 111.4 | — |
| Rheology After Aging 16 Hours at 82.2° C. (180° F.) | | | | | | | |
| PV | 5 | 4.5 | 10 | 5.5 | 4.5 | 11.5 | 8.5 |
| YP | 13 | 15.5 | 30 | 19 | 21.5 | 34.5 | 12.5 |
| 3 rpm | 3 | 8 | 16 | 7 | 13.5 | 20.5 | 5.5 |
| LSRV (×10⁻³) | 0.64 | 5.6 | 40.6 | 2.64 | 18.0 | 53.6 | 10.0 |
| STI | 4.8 | 26.9 | 91.9 | 11.8 | 55.6 | 100.8 | 61.0 |

TABLE C

| Composition | 1 | 2 | 3 | 4 | 5 | 6 | 7 | 8 | 9 |
|---|---|---|---|---|---|---|---|---|---|
| Water, cc | 350 | 350 | 350 | 350 | 350 | 350 | 350 | 350 | 350 |
| BI, g | 1.5 | 1.5 | 1.5 | 1.5 | 1.5 | 1.5 | 1.5 | 0 | 0 |
| BII, g | 0 | 0 | 0 | 0 | 0 | 0 | 0 | 1.5 | 1.5 |
| OSM, g | 0 | 0.5 | 10 | 0 | 0 | 0.5 | 10 | 0 | 0.5 |
| MgO, g | 0 | 0 | 0 | 0 | 1.0 | 1.0 | 1.0 | 1.0 | 1.0 |
| ZnO, g | 2.0 | 2.0 | 2.0 | 0 | 0 | 0 | 0 | 0 | 0 |
| Initial Rheology | | | | | | | | | |
| PV | 5.5 | 8.5 | 9.5 | 5 | 5 | 7 | 8 | 5.5 | 6.5 |
| YP | 14.5 | 17.5 | 17 | 15.5 | 16 | 15 | 16 | 12 | 14.5 |
| 3 rpm | 8 | 10 | 8.5 | 9 | 8 | 7 | 7.5 | 5 | 6 |
| LSRV (×10⁻³) | 17.6 | 21.1 | 20.8 | 19.2 | 13.6 | 14.4 | 17.4 | 6.4 | 8.6 |
| STI | 88.0 | 82.1 | 86.0 | 93.7 | 65.7 | 70.9 | 81.3 | 45.7 | 48.9 |
| Rheology After Aging 16 Hours at 82.2° C. (180° F.) | | | | | | | | | |
| PV | 4.5 | 5 | 7 | 4.5 | 4 | 5 | 6.5 | 5 | 6.5 |
| YP | 9 | 11 | 18 | 9 | 11 | 11.5 | 16 | 11 | 13 |
| 3 rpm | 3 | 4 | 8.5 | 1.5 | 3.5 | 5 | 8 | 4.5 | 5.5 |
| LSRV (×10⁻³) | 0.9 | 1.9 | 16.6 | 0.28 | 1.2 | 4.6 | 15.2 | 5.2 | 7.8 |
| STI | 9.0 | 14.7 | 74.1 | 3.4 | 10.3 | 32.9 | 74.5 | 39.4 | 48.7 |

TABLE D

| Composition | 1 | 2 | 3 | 4 | 5 | 6 |
|---|---|---|---|---|---|---|
| Water, cc | 350 | 350 | 350 | 350 | 350 | 350 |
| BI, g | 1.5 | 1.5 | 1.5 | 1.5 | 1.5 | 1.5 |
| MgO, g | 1.0 | 1.0 | 1.0 | 1.0 | 1.0 | 1.0 |
| STS, g | 0 | 3.0 | 3.0 | 0 | 0 | 0 |
| OSM, g | 0 | 0 | 10.0 | 0.5 | 2.5 | 10.0 |
| Initial Rheology | | | | | | |
| LSRV (×10⁻³) | 13.6 | 14.2 | 18.0 | 20.6 | 19.8 | 17.7 |
| STI | 65.7 | 75.5 | 84.9 | 89.2 | 86.8 | 82.7 |
| Rheology After Aging 16 Hours at 82.2° C. (180° F.) | | | | | | |
| LSRV (×10⁻³) | 1.2 | 6.8 | 17.1 | 11.6 | 12.4 | 18.4 |
| STI | 10.3 | 42.2 | 80.7 | 54.5 | 61.4 | 83.6 |

TABLE E

| Composition | 1 | 2 | 3 | 4 | 5 | 6 | 7 | 8 |
|---|---|---|---|---|---|---|---|---|
| Water, cc | 350 | 350 | 350 | 350 | 350 | 350 | 350 | 350 |
| Polyanionic Cellulose, g | 1.5 | 1.5 | 1.5 | 0 | 0 | 0 | 0 | 0 |
| Modified Polysaccharide Gum, g | 0 | 0 | 0 | 1.5 | 1.5 | 1.5 | 0 | 0 |
| Hydroxethyl Cellulose, g | 0 | 0 | 0 | 0 | 0 | 0 | 1.5 | 1.5 |
| NaOH, g | 1 | 1 | 0 | 1 | 1 | 0 | 0 | 0 |
| MgO, g | 0 | 0 | 2 | 0 | 0 | 2 | 1 | 1 |
| OSM, g | 0 | 10 | 10 | 0 | 10 | 10 | 0 | 5 |
| Rheology After Aging 16 Hours at 82.2° C. (180° F.) | | | | | | | | |
| PV | 5 | 14.5 | 15 | 7 | 10.5 | 14.5 | 13 | 17.5 |
| YP | 0 | 13.5 | 12 | 1 | 15 | 24.5 | 22 | 32.5 |
| 3 rpm | 0.5 | 1 | 1 | 0.5 | 1 | 3.5 | 2 | 4 |
| LSRV | 40 | 100 | 200 | 50 | 190 | 40 | 300 | 700 |
| STI | 1.5 | 1.2 | 2.1 | 1.5 | 1.7 | 2.1 | 2.1 | 2.8 |

TABLE F

| Composition | 1 | 2 | 3 | 4 |
|---|---|---|---|---|
| Water, cc | 350 | 350 | 350 | 350 |
| BIII, g | 1.5 | 1.5 | 1.5 | 1.5 |
| MgO, g | 0 | 1.0 | 1.0 | 1.0 |
| OSM, g | 0 | 0 | 0.5 | 10.0 |
| Initial Rheology | | | | |
| LSRV (×10⁻³) | 11.9 | 8.4 | 14.9 | 28.9 |
| STI | 88.9 | 66.7 | 59.2 | 79.3 |
| PV | 5 | 4 | 7 | 11 |
| YP | 12 | 14 | 17 | 27 |
| 3 rpm | 10 | 8 | 8.5 | 15 |
| Properties After Hot Rolling 16 Hours at 180° F. | | | | |
| LSRV (×10⁻³) | 0.3 | 0.9 | 2.5 | 24.0 |
| STI | 3.8 | 8.8 | 17.7 | 46.6 |
| PV | 4 | 4 | 5 | 14 |
| YP | 11 | 11 | 13 | 24 |
| 3 rpm | 3 | 5 | 5 | 16 |
| Fluid Loss, cc | 48 | 84 | 20 | 9 |

TABLE G

| Composition | 1 | 2 | 3 | 4 | 5 | 6 |
|---|---|---|---|---|---|---|
| KELZAN XCD, g | 1.0 | 1.0 | 1.5 | 1.5 | 2.0 | 2.0 |
| MgO, g | 0.67 | 0.67 | 1.00 | 1.00 | 1.33 | 1.33 |
| OSM, g | 0.33 | 10.33 | 0.50 | 10.50 | 0.67 | 10.67 |
| Initial Rheology | | | | | | |
| PV, cp | 3 | 8 | 5 | 14 | 8 | 14 |
| YP, lb/100 ft² | 10 | 10 | 13 | 12 | 20 | 22 |
| 3 rpm | 5 | 6 | 10 | 10 | 14 | 17 |
| LSRV (×10⁻³), cp | 2.2 | 3.6 | 7.5 | 13.2 | 23.2 | 28.8 |
| STI | 18.3 | 26.5 | 40.0 | 54.1 | 76.6 | 62.6 |
| Rheology After Aging 16 Hours at 82.2° C. (180° F.) | | | | | | |
| PV, cp | 3 | 5 | 4 | 8 | 5 | 15 |
| YP, lb/100 ft² | 9 | 10 | 12 | 17 | 19 | 15 |
| 3 rpm | 3 | 6 | 6 | 10 | 11 | 16 |
| LSRV (×10⁻³), cp | 0.8 | 3.2 | 3.3 | 11.7 | 9.5 | 24.8 |
| STI | 8.3 | 20.7 | 24.5 | 45.8 | 37.9 | 69.5 |
| API Fluid Loss, cc | 22 | 12 | 21 | 9.4 | 18 | 9.7 |

What is claimed is:

1. In an aqueous-base drilling fluid for the drilling or servicing of oil or gas wells comprising an aqueous liquid having incorporated therein one or more polysaccharides in an amount to increase the low shear rate viscosity or decrease the fluid loss of the aqueous-base fluid, the improvement which comprises incorporating into the aqueous-base fluid an oligosaccharide mixture composed of arabinose, mannose, galactose, glucose, and xylose sugar units, the oligosaccharide mixture consisting of pentosans and hexosans containing from one to four combined sugar units, wherein the concentration of the oligosaccharide mixture is sufficient to increase the thermal stability or decrease the fluid loss of the fluid, wherein the fluid has a pH from about 7.5 to about 11.5, and wherein the fluid additionally contains magnesium oxide.

2. The fluid of claim 1 wherein there is added at least about 0.7 kg/m³ of the oligosaccharide mixture.

3. The fluid of claim 1 wherein there is added from about 1.4 kg/m³ to about 428 kg/m³ of the oligosaccharide mixture.

4. The fluid of claim 1 wherein there is added from about 1.4 kg/m³ to about 57 kg/m³ of the oligosaccharide mixture.

5. The fluid of claim 1 which has a pH from about 8 to about 11.

6. The fluid of claim 1 wherein the polysaccharide is a biopolymer which imparts an elevated low shear rate viscosity to the fluid as evidenced by the fluid having a shear thinning index greater than about 10.

7. The fluid of claim 6 wherein the biopolymer is xanthan gum.

8. In an aqueous base fluid for the drilling or servicing of oil or gas wells comprising an aqueous liquid having incorporated therein one or more polysaccharides in an amount to increase the low shear rate viscosity, increase the high shear rate viscosity, or decrease the fluid loss of the fluid, the improvement which comprises incorporating into the aqueous-base fluid an oligosaccharide mixture composed of arabinose, mannose, galactose, glucose, and xylose sugar units, the oligosaccharide mixture consisting of pentosans and hexosans containing from one to four combined sugar units, wherein the concentration of the oligosaccharide mixture is sufficient to increase the thermal stability of the fluid, wherein the polysaccharide is a biopolymer produced by the action of bacteria, fungi, or other microorganisms on a suitable substrate.

9. The fluid of claim 8 wherein there is added at least about 0.7 kg/m³ of the oligosaccharide mixture.

10. The fluid of claim 8 wherein there is added from about 1.4 kg/m³ to about 57 kg/m³ of the oligosaccharide mixture.

11. The fluid of claim 8 wherein the biopolymer imparts an elevated low shear rate viscosity to the fluid as evidenced by the fluid having a shear thinning index greater than about 10.

12. The fluid of claim 8 wherein the biopolymer is a xanthan gum.

13. The fluid of claim 8 wherein the biopolymer is selected from the group consisting of xanthan gum, welan gum, gellan gum, schleroglucan gum, and succinoglycan gum.

14. The method of enhancing the thermal stability or decreasing the fluid loss of an aqueous fluid having incorporated therein one or more polysaecharides in an amount sufficient to provide the fluid with the rheological or fluid loss characteristics desired, the improvement which comprises incorporating into the aqueous-base fluid an oligosaccharide mixture composed of arabinose, mannose, galactose, glucose, and xylose sugar units, the oligosaccharide mixture consisting of pentosans and hexosans containing from one to four combined sugar units, wherein the concentration of the oligosaccharide mixture is sufficient to increase the thermal stability or decrease the fluid loss of the fluid, wherein the polysaccharide is a biopolymer produced by the action of bacteria, fungi, or other microorganisms on a suitable substrate.

15. The method of claim 14 wherein there is added at least about 0.7 kg/m³ of the oligosaccharide mixture.

16. The method of claim 14 wherein there is added from about 1.4 kg/m³ to about 428 kg/m³ of the oligosaccharide mixture.

17. The method of claim 14 wherein there is added from about 1.4 kg/m³ to about 57 kg/m³ of the oligosaccharide mixture.

18. The method of claim 14 wherein the biopolymer is selected from the group consisting of xanthan gum, welan gum, gellan gum, schleroglucan gum, and succinoglycan gum.

19. The method of claim 14 wherein the biopolymer is xanthan gum.

* * * * *